US012760716B2

(12) United States Patent
Fehler

(10) Patent No.: US 12,760,716 B2
(45) Date of Patent: Oct. 13, 2026

(54) APPARATUS FOR SUPPLYING TORQUE AND SYSTEM AND METHOD FOR USE OF THE SAME

(71) Applicant: John Fehler, Meridian, TX (US)

(72) Inventor: John Fehler, Meridian, TX (US)

( * ) Notice: Subject to any disclaimer, the term of this patent is extended or adjusted under 35 U.S.C. 154(b) by 100 days.

(21) Appl. No.: 18/797,230

(22) Filed: Aug. 7, 2024

(65) Prior Publication Data

US 2025/0030307 A1 Jan. 23, 2025

Related U.S. Application Data

(63) Continuation-in-part of application No. 17/566,952, filed on Dec. 31, 2021, now abandoned.

(60) Provisional application No. 63/132,781, filed on Dec. 31, 2020.

(51) Int. Cl.
*F03G 3/00* (2006.01)
*F03G 3/08* (2006.01)
*F03G 7/10* (2006.01)

(52) U.S. Cl.
CPC ................. *F03G 3/00* (2013.01); *F03G 3/08* (2013.01); *F03G 7/107* (2021.08)

(58) Field of Classification Search
CPC ... F03G 3/00; F03G 3/087; F03G 7/10; F03G 7/104; F03G 7/107; F03G 3/08; H02K 7/02
USPC .......................................................... 74/84 S
See application file for complete search history.

(56) References Cited

U.S. PATENT DOCUMENTS

| | | | |
|---|---|---|---|
| 4,509,329 | A | 4/1985 | Breston |
| 4,589,259 | A | 5/1986 | Boutto et al. |
| 4,811,625 | A | 3/1989 | Sorg et al. |
| 5,156,058 | A | 10/1992 | Bristow, Jr. |
| 5,667,038 | A | 9/1997 | Tarnopolsky |
| 5,832,788 | A | 11/1998 | Lopaska |
| 5,860,317 | A | 1/1999 | Laithwaite et al. |
| 5,921,133 | A | 7/1999 | Mikhail |
| 6,237,342 | B1 | 5/2001 | Hurford |

(Continued)

FOREIGN PATENT DOCUMENTS

| | | | |
|---|---|---|---|
| FR | 2298709 | 8/1976 | |
| FR | 2298709 A1 * | 8/1978 | ............. F03G 7/107 |

(Continued)

OTHER PUBLICATIONS

"Invitation to Pay Additional Fees and, Where Applicable, Protest Fee." Mar. 9, 2022, for International Application No. PCT/US21/65841.

*Primary Examiner* — Phillip A Johnson
(74) *Attorney, Agent, or Firm* — Scott Griggs; Griggs Bergen LLP

(57) ABSTRACT

An apparatus for supplying torque and a system and method for use of the same are disclosed. In one embodiment of the apparatus, a pair of frames are positioned in a spaced, offset relationship. Each of the frames includes a central hub with arm rails radially extending therefrom. Momentum arms having weighted ends are secured to the pair of frames to form a lattice-like structure. A force, whether hydraulic, wind or from a linear motor, is applied. Each of the momentum arms faces the same direction and maintains a position parallel to the ground during rotation of the apparatus, which may be mechanically coupled to a drive unit for the supply of torque thereto.

11 Claims, 15 Drawing Sheets

(56) References Cited

U.S. PATENT DOCUMENTS

| | | | | |
|---|---|---|---|---|
| 6,363,804 | B1 | 4/2002 | Mikhail | |
| 6,694,844 | B2 | 2/2004 | Love | |
| 6,764,275 | B1 * | 7/2004 | Carr | F03B 17/04 60/639 |
| 9,670,910 | B1 | 6/2017 | Shapour et al. | |
| 10,495,071 | B1 | 12/2019 | Jenkins | |
| 10,781,901 | B2 | 9/2020 | Jebari | |
| 2002/0104392 | A1 | 8/2002 | Murray | |
| 2007/0012518 | A1 | 1/2007 | Gomez-Nacer | |
| 2008/0011552 | A1 | 1/2008 | La Perle | |
| 2013/0256067 | A1 | 10/2013 | Ribeiro | |
| 2013/0284540 | A1 | 10/2013 | Ribeiro | |
| 2014/0083800 | A1 | 3/2014 | Ribeiro | |
| 2014/0187375 | A1 | 7/2014 | Leviny | |
| 2016/0195071 | A1 | 7/2016 | Pellegrin | |
| 2016/0237992 | A1 | 8/2016 | Chicoski | |
| 2016/0369785 | A1 | 12/2016 | Azizians | |
| 2017/0045041 | A1 | 2/2017 | Ishida | |
| 2017/0254324 | A1 | 9/2017 | Hemmerle | |
| 2017/0268488 | A1 | 9/2017 | Faridi | |
| 2018/0041097 | A1 | 2/2018 | Kanahama | |
| 2019/0219037 | A1 | 7/2019 | Te-Chih | |
| 2019/0301437 | A1 | 10/2019 | Pervez | |
| 2020/0049132 | A1 | 2/2020 | Turner | |
| 2020/0049133 | A1 | 2/2020 | Pellegrin | |
| 2021/0033077 | A1 * | 2/2021 | Traner | F03G 7/107 |

FOREIGN PATENT DOCUMENTS

| | | | | |
|---|---|---|---|---|
| FR | 2671832 | | 7/1992 | |
| FR | 2671832 | A1 * | 7/1992 | F03G 7/125 |

* cited by examiner

APPARATUS FOR SUPPLYING TORQUE AND SYSTEM AND METHOD FOR USE OF THE SAME

PRIORITY STATEMENT & CROSS-REFERENCE TO RELATED APPLICATIONS

This application is a continuation-in-part of co-pending U.S. patent application Ser. No. 17/566,952, entitled “Torque Generator and System and Method for Use of the Same” and filed on Dec. 31, 2021 in the name of John C. Fehler; which claims the benefit of provisional United States Patent Application No. 63/132,781, entitled “Torque Generator and System and Method for Use of the Same” and filed on Dec. 31, 2020, in the name of John C. Fehler; both of which are hereby incorporated by reference, in entirety, for all purposes.

TECHNICAL FIELD OF THE INVENTION

This invention relates, in general, to the field of energy conversion and, in particular, to an apparatus for supplying torque and a system and method for use of the same that efficiently converts various forms of potential energy, such as hydraulic, wind, or electrical energy, into mechanical energy.

BACKGROUND OF THE INVENTION

The field of energy conversion and conservation encompasses a variety of technologies aimed at transforming different forms of potential energy into mechanical energy. Efficient storage and conversion of energy are critical for numerous applications, ranging from industrial processes to renewable energy systems. Mechanical devices, such as those utilizing the conservation of angular momentum, play a significant role in these applications by storing rotational energy and converting it into useful work. Traditional energy conversion systems often rely on hydraulic forces, wind forces, and electrical energy stored in batteries or capacitors. Each of these energy sources presents unique challenges and opportunities for efficient conversion into mechanical energy. Despite advancements in energy conversion technologies, there remains a need for improved systems that can efficiently convert these various forms of potential energy into mechanical energy. Such systems must adhere to the laws of thermodynamics, accounting for all inherent energy losses due to friction, air resistance, and other inefficiencies. By doing so, these systems can ensure reliable energy conversion for a wide range of applications.

SUMMARY OF THE INVENTION

It would be advantageous to achieve an apparatus for supplying torque that efficiently converts various forms of potential energy into mechanical energy. This invention provides such an apparatus, utilizing hydraulic forces, wind forces, or linear motors, for example, to generate torque. In one embodiment of the apparatus, a pair of frames are positioned in a spaced, offset relationship. Each of the frames includes a central hub with arm rails radially extending therefrom. Momentum arms having weighted ends are secured to the pair of frames to form a lattice-like structure. Each of the momentum arms faces the same direction and maintains a position parallel to the ground during rotation of the apparatus, which may be mechanically coupled to a drive unit for the transfer of torque thereto.

In another embodiment of the apparatus, a pair of spaced frames each have a central hub aligned with a common axis. Radial arms extend from the central hubs and linkage members respectively join the arm rails. Each of the linkage members includes a contra-rotating differential gear box having a drive shaft therethrough with a pair of one-way bearings mounted at each end of the drive shaft. Momentum arms having weights are secured to each of the drive shafts. Each of the momentum arms faces the same direction and maintains a position parallel to the ground during rotation of the apparatus, which may be mechanically coupled to a drive unit for the transfer of torque thereto. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Figure 1:
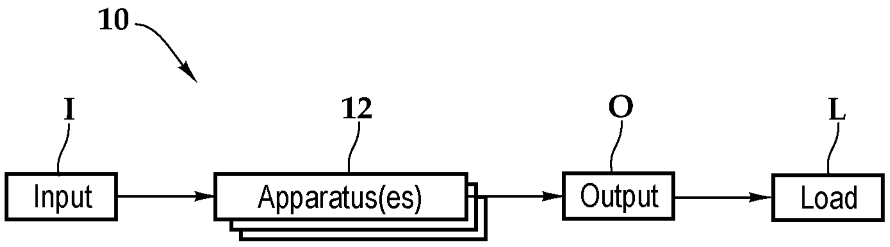
FIG. 1 is a schematic diagram depicting one embodiment of a system for providing energy utilizing an apparatus for supplying torque, according to the teachings presented herein.
Figure 2:
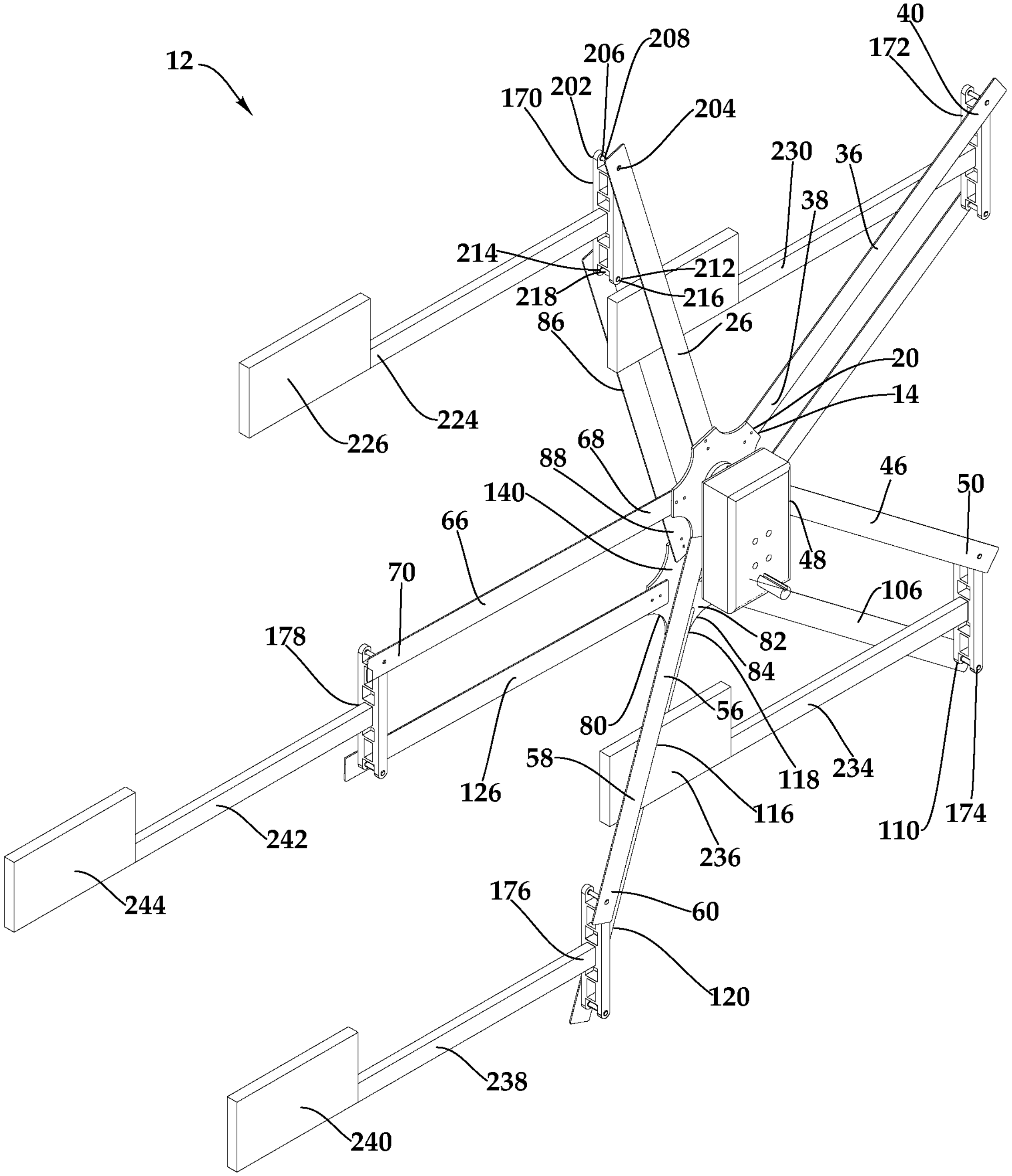
FIG. 2 is a top front perspective view depicting one embodiment of the apparatus of FIG. 1.
Figure 3:
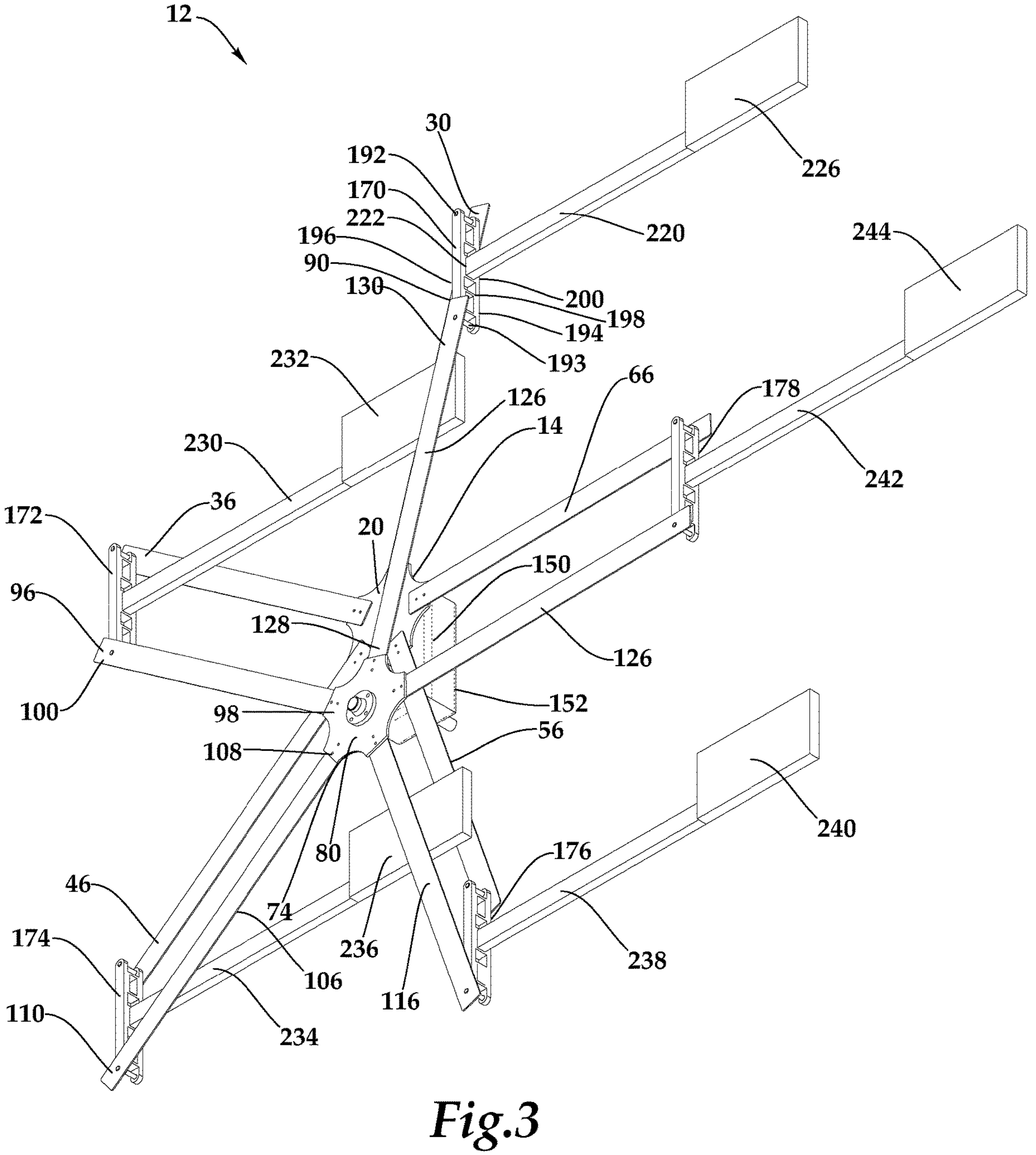
FIG. 3 is a bottom rear perspective view of the apparatus of FIG. 2.
Figure 4:
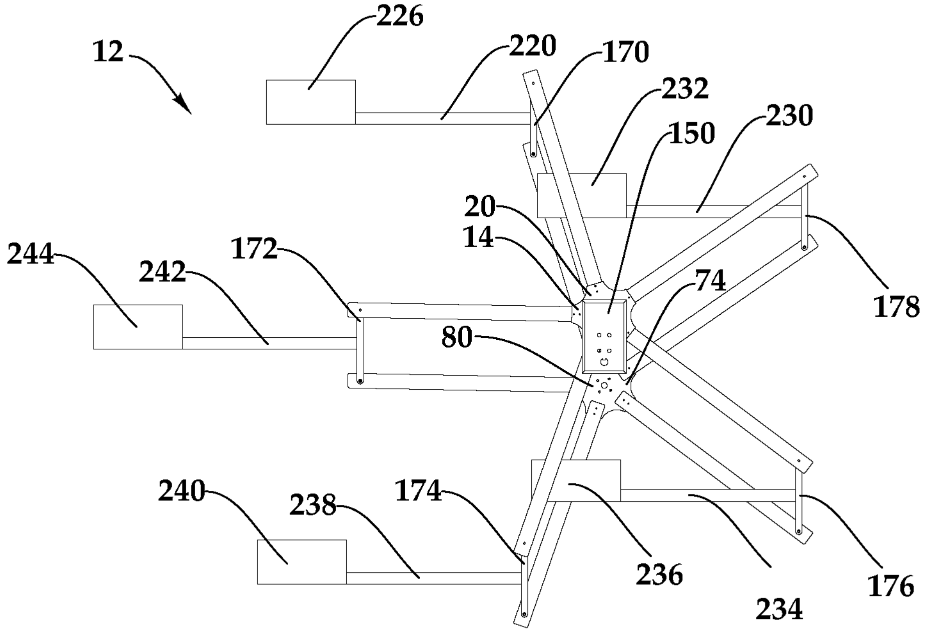
FIG. 4 is a front elevation view of the apparatus of FIG. 2.
Figure 5:
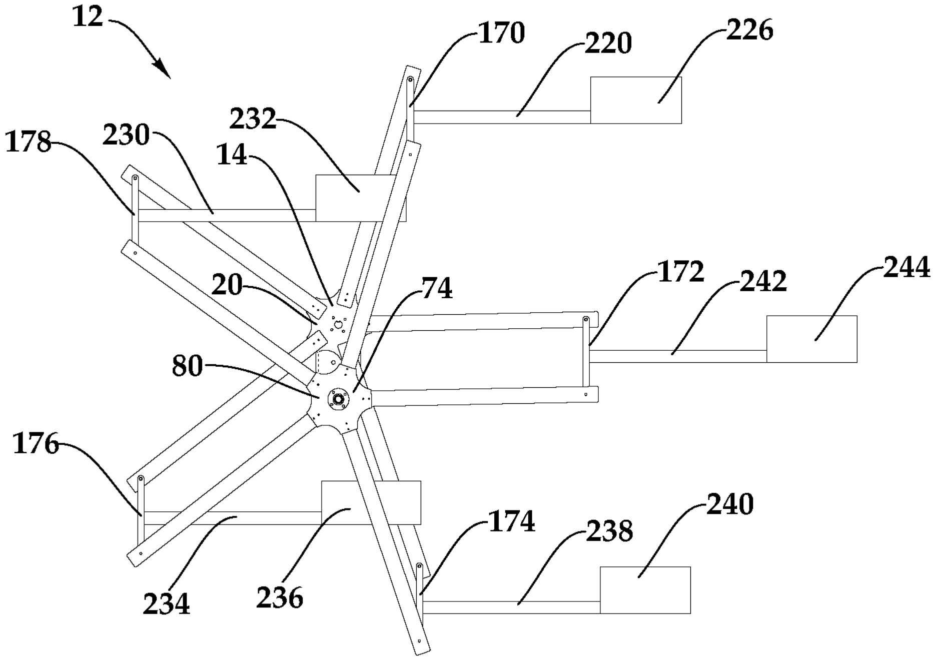
FIG. 5 is a rear elevation view of the apparatus of FIG. 2.
Figure 6:
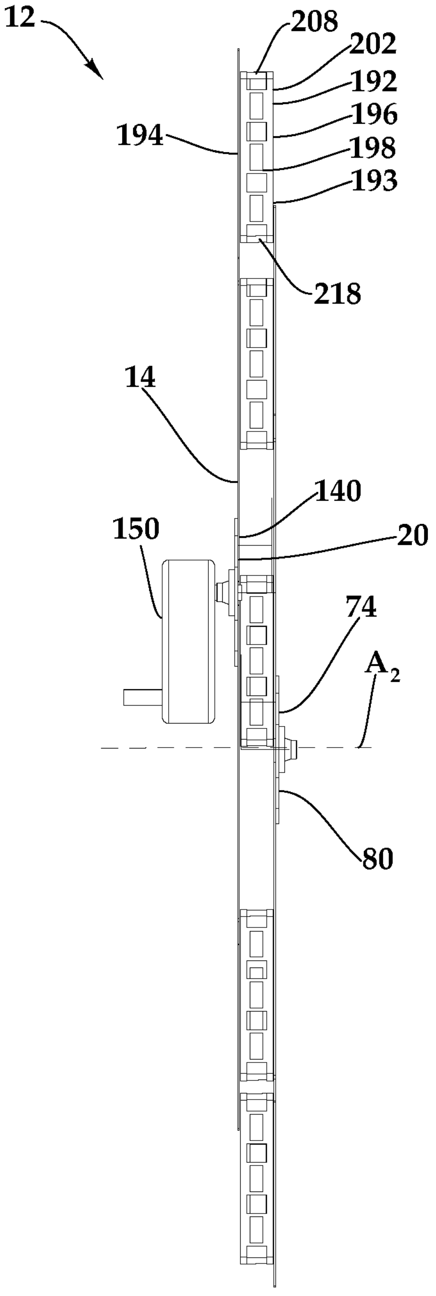
FIG. 6 is a left elevation view of the apparatus of FIG. 2.
Figure 7:
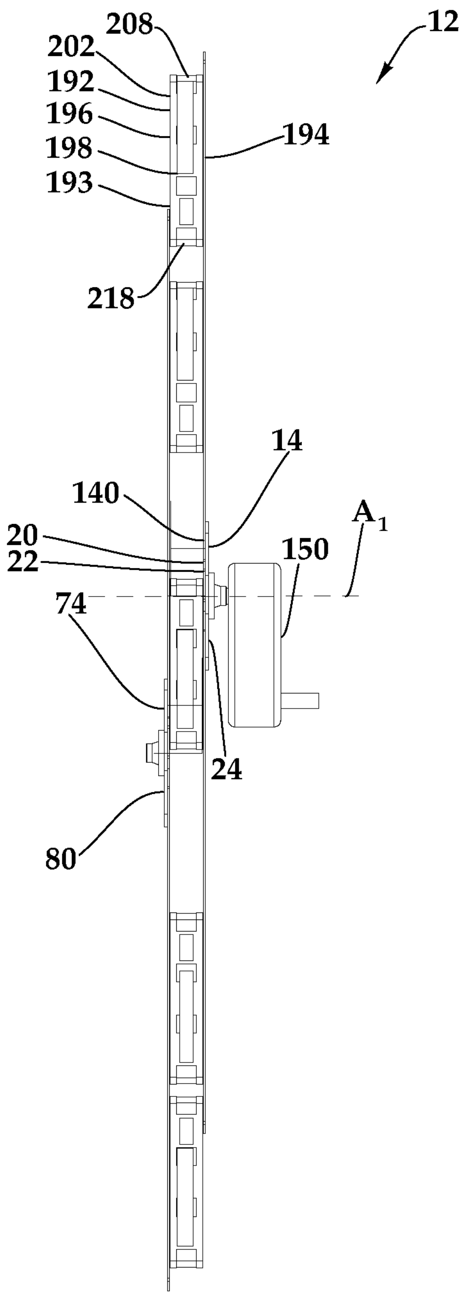
FIG. 7 is a right elevation view of the apparatus of FIG. 2.
Figure 8:
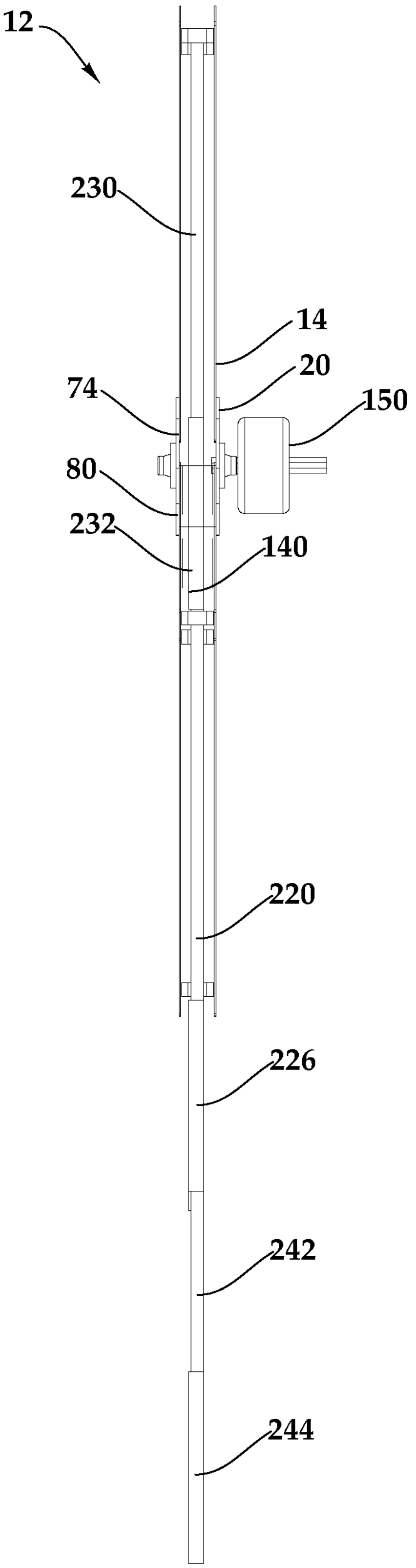
FIG. 8 is a top plan view of the apparatus of FIG. 2.
Figure 9:
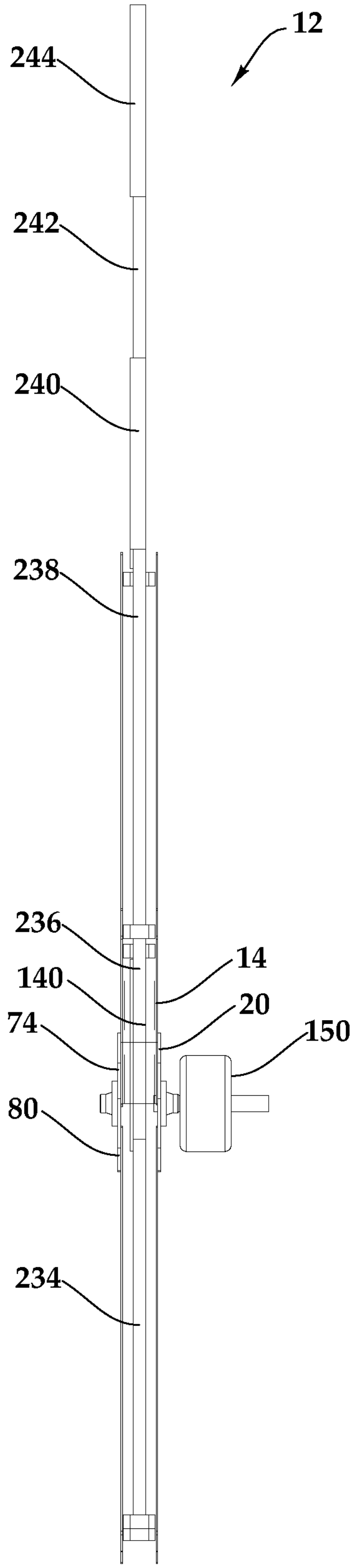
FIG. 9 is a bottom plan view of the apparatus of FIG. 2.

Referring initially to FIG. 1, therein is depicted one embodiment of a system 10 that utilizes an apparatus for supply torque 12 or more than one apparatuses 12, in a daisy chain connection, to supply torque. As shown, an input I, such as hydraulic or wind forces or one or more linear motors with power supplied by a store of electricity, acts on the apparatus 12 to drive an output O, such as torque, acting on a load L, which may be a drive unit. The drive unit may be a unit selected from electric motors, internal combustion engines, hydraulic motors, aerostatic engines, gear boxes, and flywheels, for example. The system 10 accounts for all energy losses due to friction, air resistance, and mechanical inefficiencies. The drive unit may further be a unit utilized in an application selected from the group consisting of pumping, propelling, powering, spinning, drilling, mining, crushing, pulverizing, ventilating, and gearing supporting repetitive motion.

By way of additional explanation, pumping may relate to water wells, oil wells, and gas wells, as well as other fluid capture and distribution. Propelling may relate to large shipping locomotion and other transport. Powering may relate to super-efficient motor components to power remote or decentralized, off-grid applications, like extraction field sites, kiosk power stations or backup power supplies, for example. Spinning may relate to boosting turbine-driven applications like power plants (carbon-based, nuclear, wind turbines, ocean wave power generation), and industrial turbine applications. Drilling and/or mining may relate to applications for exploration and extraction (oil, gas, minerals and natural resources), and industrial drilling application. Crushing and/or pulverizing may relate to rock, quarry operations, concrete operations, wood pulp operations, and recycled waste products operations, for example. Ventilating may relate to exhaust and ventilation systems. Lastly, repetitive motion through proper gearing may relate to efficiently generating a variety of continuous motion applications, such as industrial conveyor belt or mixing operations.

Referring now to FIG. 2 through FIG. 9, one embodiment of the apparatus 12 is depicted. A frame 14 includes a central hub 20 with a horizontal axis A1 therethrough. The central hub 20 includes an interior surface 22 and an exterior surface 24. An arm rail 26 having a proximal end 28 and a distal end 30 is coupled to the central hub 20 at the proximal end 28 to radially extend from the central hub 20. Similarly, an arm rail 36 having a proximal end 38 and a distal end 40 is coupled to the central hub 20 at the proximal end 38. Likewise, an arm rail 46 with a proximal end 48 and a distal end 50; an arm rail 56 with a proximal end 58 and a distal end 60; and an arm rail 66 with a proximal end 68 and a distal end 70 are coupled to the central hub 20 at the respective proximal ends 48, 58, 68.

A frame 74 includes a central hub 80 with a horizontal axis A2 therethrough. The central hub 80 includes an interior surface 82 and an exterior surface 84. An arm rail 86 having a proximal end 88 and a distal end 90 is coupled to the central hub 80 at the proximal end 88 to radially extend from the central hub 80. Similarly, an arm rail 96 having a proximal end 98 and a distal end 100 is coupled to the central hub 80 at the proximal end 98. Likewise, an arm rail 106 with a proximal end 108 and a distal end 110; an arm rail 116 with a proximal end 118 and a distal end 120; and an arm rail 126 with a proximal end 128 and a distal end 130 are coupled to the central hub 80 at the respective proximal ends 108, 118, 128.

As depicted, the frames 14, 74 are located in a spaced, offset relationship with a cavity 140 therebetween, such that the interior surface 22 of the hub 20 opposes the interior surface 82 of the hub 80. Further, the frames 14, 74 may include an eccentric positioning. As shown, the frames 14, 74 are positioned in parallel with horizontal axis A1 being parallel to the horizontal axis Az. As one skilled in the art may appreciate, each of the frames 14, 74 may be mounted to a shaft. Further, as shown, a drive unit 150 may be secured to the frame 14, for example. The drive unit 150 may include a gear box and specifically a counter-rotating gear box 152.

Linkage members 170, 172, 174, 176, 178 respectively pivotally couple the arm rails 26, 86; the arm rails 36, 96; the arm rails 46, 106; the arm rails 56, 116; and the arm rails 66, 126. With respect to the linkage member 170, as an exemplary linkage member, the linkage member 170 includes an upper end 192 and a lower end 193. A pair of spaced vertical connection bars 194, 196 are provided with horizontal connection bars 198 spanning the space between the pair of spaced vertical connection bars 194, 196. The pair of spaced vertical connection bars 194, 196 and the horizontal connection bars 198 form a rigid structure 200.

A pivot pin assembly 202 is located at the upper end 192 to pivotally connect the linkage member 170 to the distal end 30 of the arm rail 26. The pivot pin assembly 202 includes an opening 204 at the distal end 30 of the arm rail 26 and an opening 206 in the upper end 192 of the linkage member 170 with a pivot pin 208 therethrough. Similarly, a pivot pin assembly 212 is located at the lower end 193 to pivotally connect the linkage member 170 to the distal end 90 of the arm rail 86. The pivot pin assembly 212 includes an opening 214 at the distal end 90 of the arm rail 86 and an opening 216 in the lower end 193 of the linkage member 170 with a pivot pin 218 therethrough. A momentum arm 220 having a connection end 222 and a weighted end 224 is secured by the connection end 222 in the illustrated embodiment proximate to lower end 193 of the linkage member 170. A weight 226 is secured to the weighted end 224 of the momentum arm 220. The linkage member 170 maintains the momentum arm 220 parallel to the ground during rotation. It should be appreciated that although one particular embodiment of linkage member is shown and described with respect to the linkage member 170, the linkage member may include any linkage means, such as a wheel member, for example, for maintaining the momentum arm 220 parallel to the ground.

With respect to the linkage members 172, 174, 176, 178, a momentum arm 230 having a weight 232 is secured to the linkage member 172; a momentum arm 234 having a weight 236 is secured to the linkage member 174; a momentum arm 238 having a weight 240 is secured to the linkage member 176; and a momentum arm 242 having a weight 244 is secured to the linkage member 178. As shown, each of the momentum arms 220, 230, 234, 238, 242 faces the same direction, with each of the momentum arms 220, 230, 234, 238, 242 being parallel to the ground with an axis of rotation A3 parallel to the horizontal axis A1 and the horizontal axis A2.

Figure 10B:
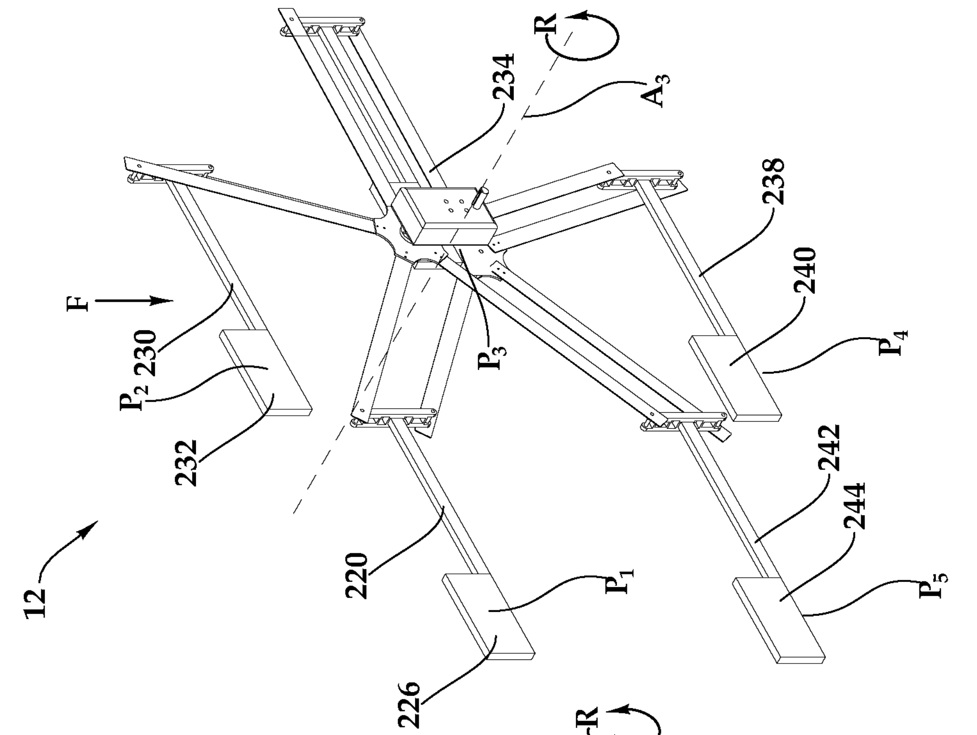
FIG. 10B is a top front perspective view depicting a second operational embodiment of the apparatus of FIG. 2.
Figure 10A:
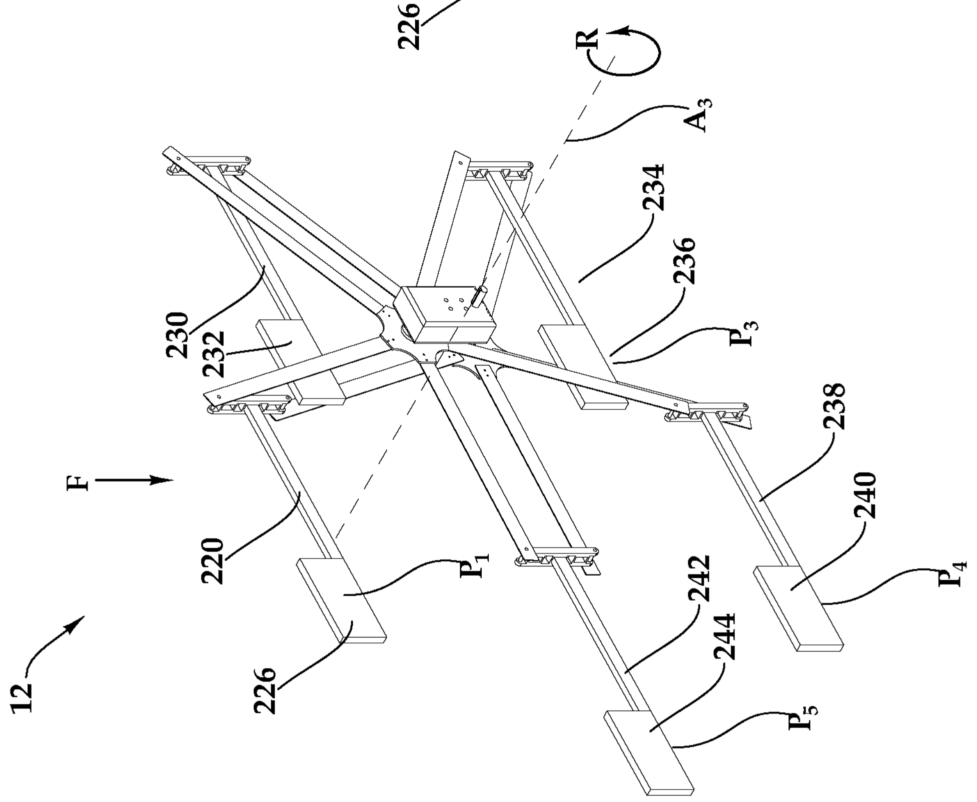
FIG. 10A is a top front perspective view depicting a first operational embodiment of the apparatus of FIG. 2.

Referring now to FIG. 10A and FIG. 10B, as shown by the arrow R and points of rotation P1, P2, P3, P4, P5, which respectively correspond to the momentum arms 220, 230, 234, 238, 242, in response to forces F, such as hydraulic forces, wind forces or linear motors, for example, acting on the weights 226, 232, 236, 240, 244 of the momentum arms 220, 230, 234, 238, 242, the points P1, P2, P3, P4, P5 are caused to fixedly rotate about the axis of rotation A3 while the weights 226, 232, 236, 240, 244 are parallel to the ground.

Accordingly, the apparatus 12, along with the system 10 and method for use of the same, are provided that efficiently supply torque. The mechanical-based solution that, with the assistance of hydraulic forces, wind forces or linear motors, for example, enables the reliable supply of torque with high efficiency and is ideal for a variety of applications, including, but not limited to high torque, low rpm applications and remote location applications with limited infrastructure. In some embodiments, the apparatus 12 provides a highly efficient duty cycle motor utilizing renewable or traditional energy solutions to supply torque.

The versatility of the apparatus 12 offers limitless configurations. As mentioned in the discussion of FIG. 1, in order to further customization to accommodate multiple situations, the apparatus 12 may include a power output increase by enlarging the size of the engine or by "daisy chaining" several engines together to increase the overall output. With the scaling and customization, the apparatus 12 remains transportable. The apparatus 12 may be carried onto oilfield operations to power communications and monitoring systems or even to disaster areas immediately following the disaster.

Figure 11:
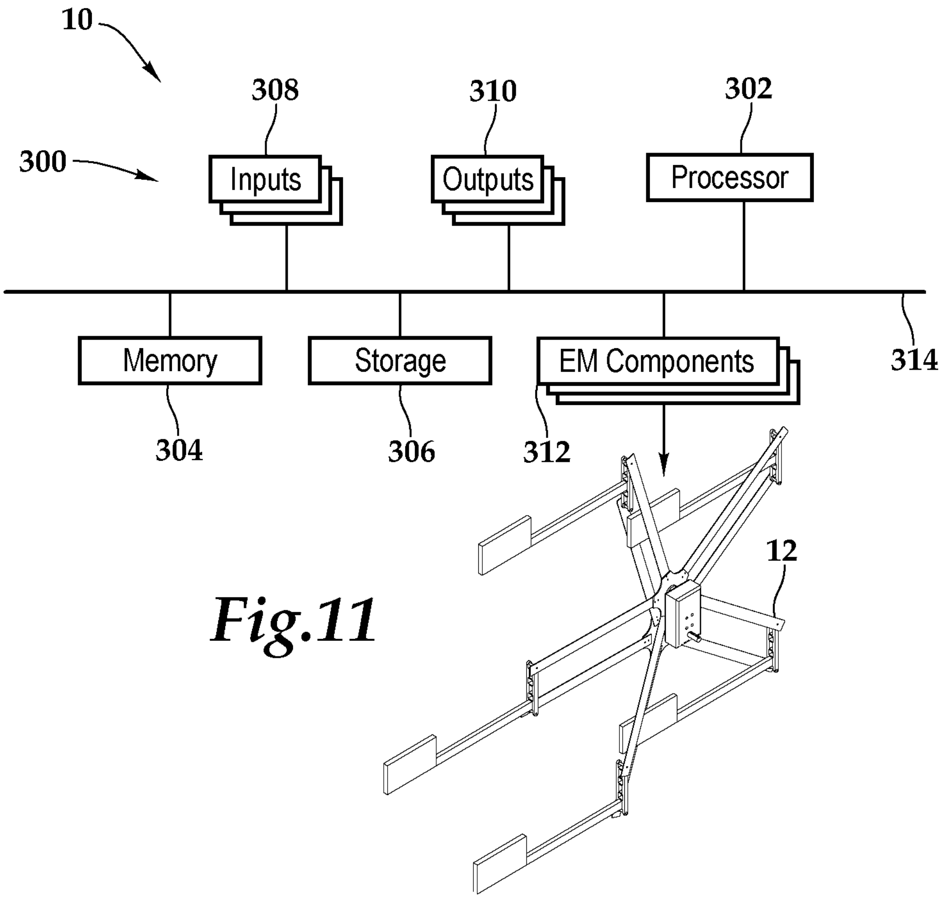
FIG. 11 is a schematic diagram depicting one embodiment of a system for providing energy utilizing an apparatus for supplying torque, according to the teachings presented herein.

Referring now to FIG. 11, in one embodiment of the system 10, electronics 300, including electromechanical components, may be integrated with the apparatus 12. In the illustrated embodiment, a processor 302, memory 304, storage 306, inputs 308, outputs 310, and electromechanical components 312 are interconnected by a bus architecture 314 within a mounting architecture. The processor 302 may process instructions for execution within a computing device, including instructions stored in the memory 304 or in the storage 306. The memory 304 stores information within the computing device. In one implementation, the memory 304 is a volatile memory unit or units. In another implementation, the memory 304 is a non-volatile memory unit or units. The storage 306 provides capacity that is capable of providing mass storage. The inputs 308 and the outputs 310 provide connections to and from the computing device, wherein the inputs 308 are the signals or data received, and the outputs 310 are the signals or data sent. As previously discussed, the electromechanical components 312 may include motors or generators, for example, that are positioned on the apparatus 12, including on the drive unit 150 or associated therewith, such as being positioned on a flywheel, as will be described in FIG. 12A and FIG. 12B. By way of further example, the electromechanical components may include a linear motor or linear motors secured to at least one of the frame 14 and the frame 74. In this configuration, the linear motor or linear motors may provide an initial force to begin a rotational movement of the apparatus 12. Further, in this configuration, after an initial force is provided, the linear motor or linear motors may also provide continuing or continuous force to maintain the rotational movement of the apparatus 12.

The memory 304 and the storage 306 are accessible to the processor 302 and include processor-executable instructions that, when executed, cause the processor 302 to execute a series of operations. The processor-executable instructions cause the processor to analyze data for defaults and store resultant self-diagnostic data. The processor-executable instructions also cause the processor to store the data, which may include information such as duty cycles, torque generated, and rotational speed, for example. The processor-executable instructions may also cause the processor to send the data, or a portion thereof, periodically or continuously or in response to a request from a server, for example.

Figure 12B:
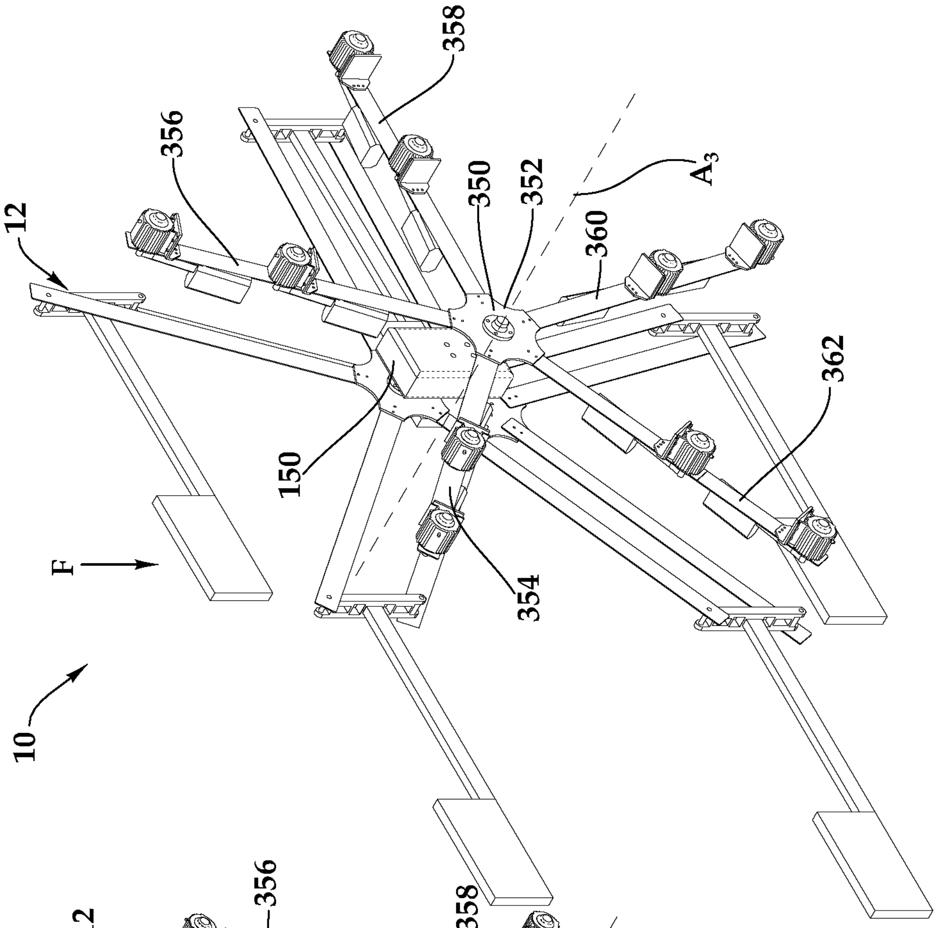
FIG. 12B is a top front perspective view depicting a second operational embodiment of the apparatus of FIG. 2 coupled to a flywheel.
Figure 12A:
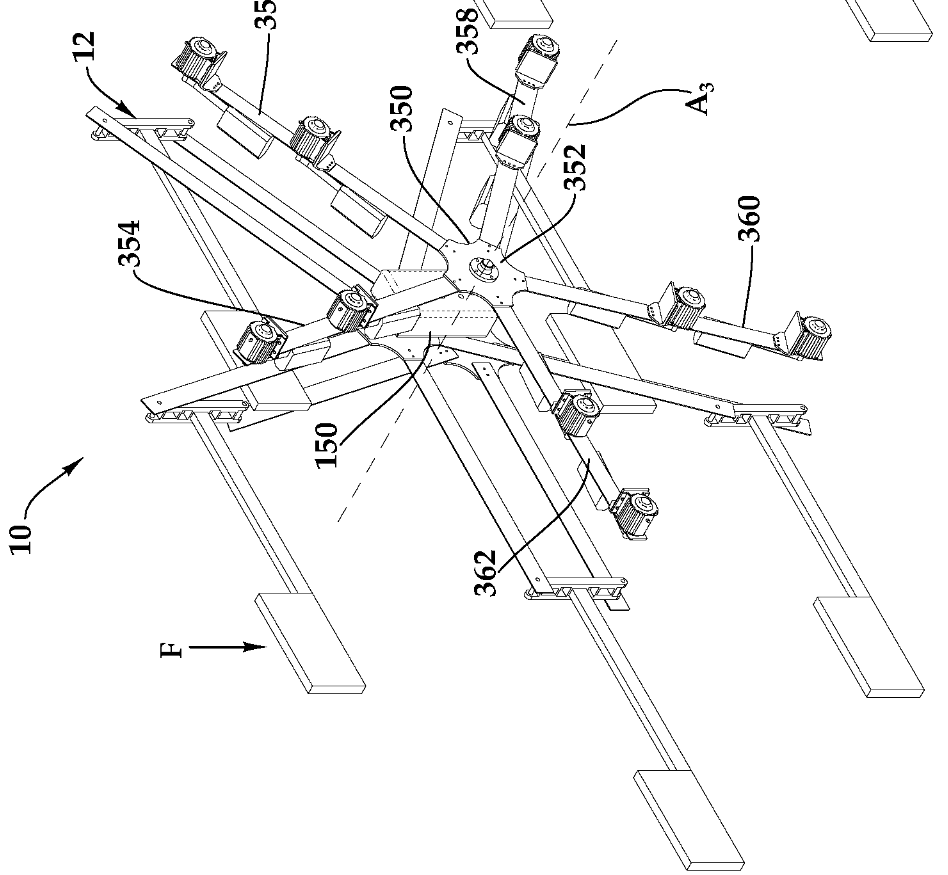
FIG. 12A is a top front perspective view depicting a first operational embodiment of the apparatus of FIG. 2 coupled to a flywheel.
Figure 13:
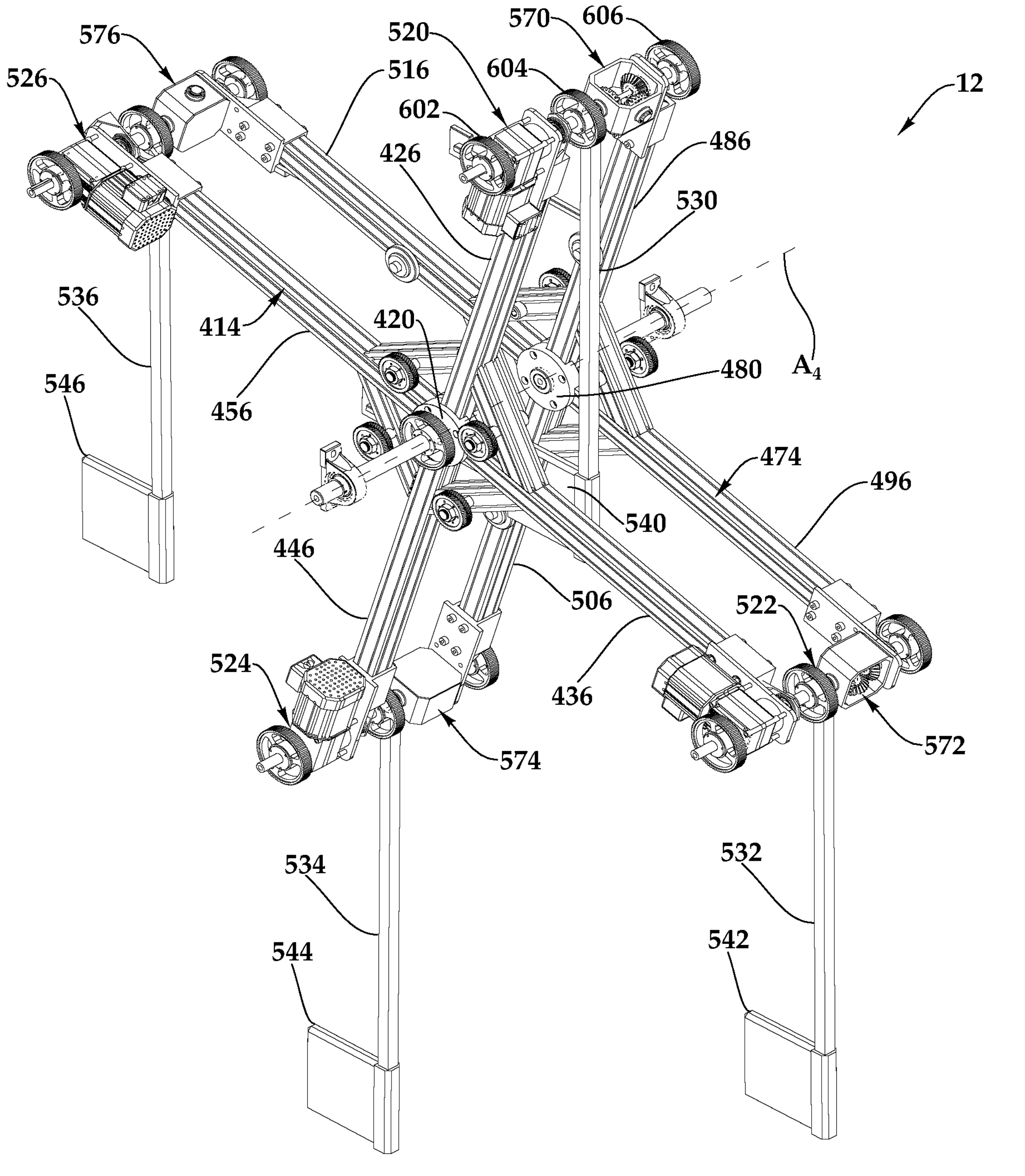
FIG. 13 is a top front perspective view depicting another embodiment of the apparatus of FIG. 1.
Figure 14:
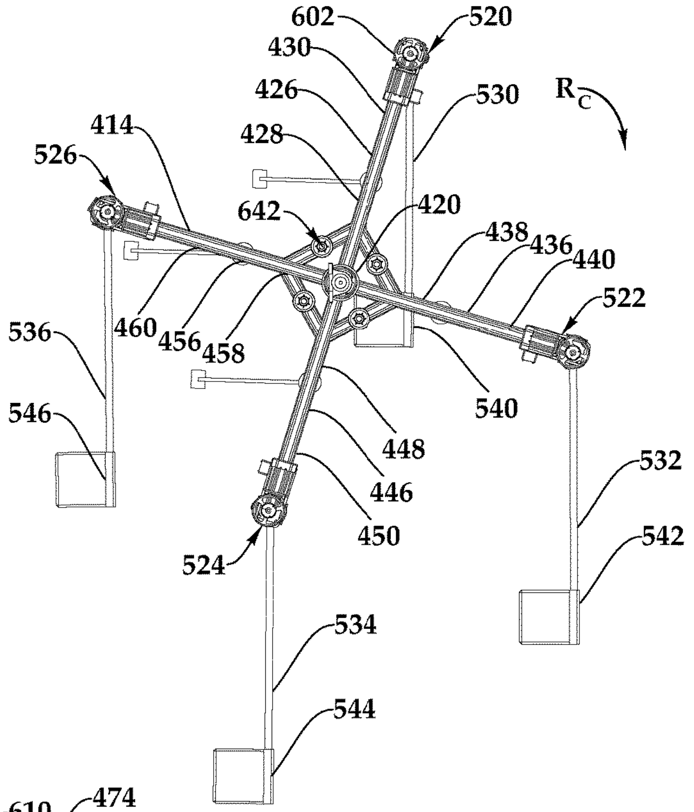
FIG. 14 is a front elevation view of the apparatus of FIG. 13.
Figure 15:
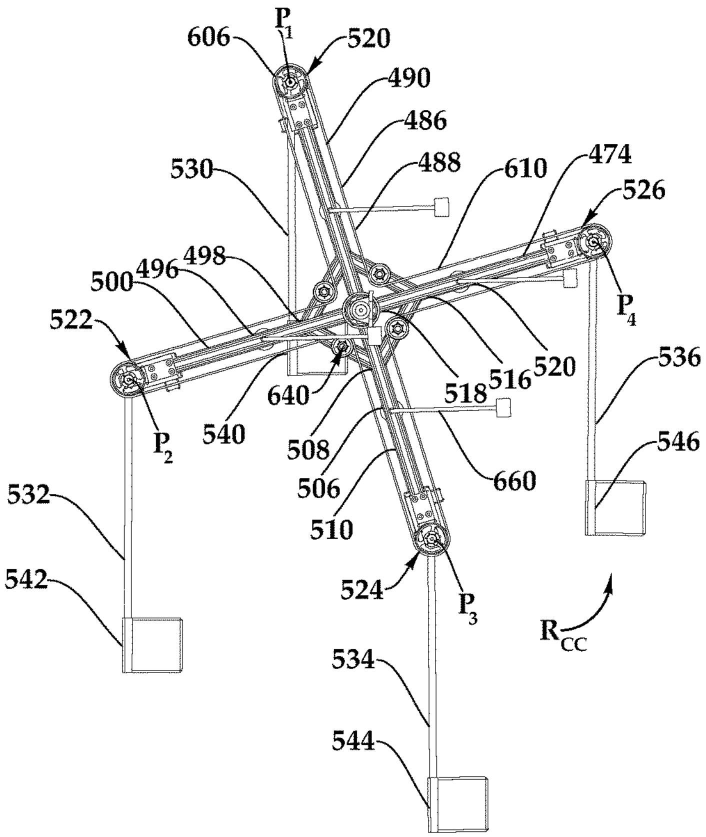
FIG. 15 is a rear elevation view of the apparatus of FIG. 13.
Figure 16:
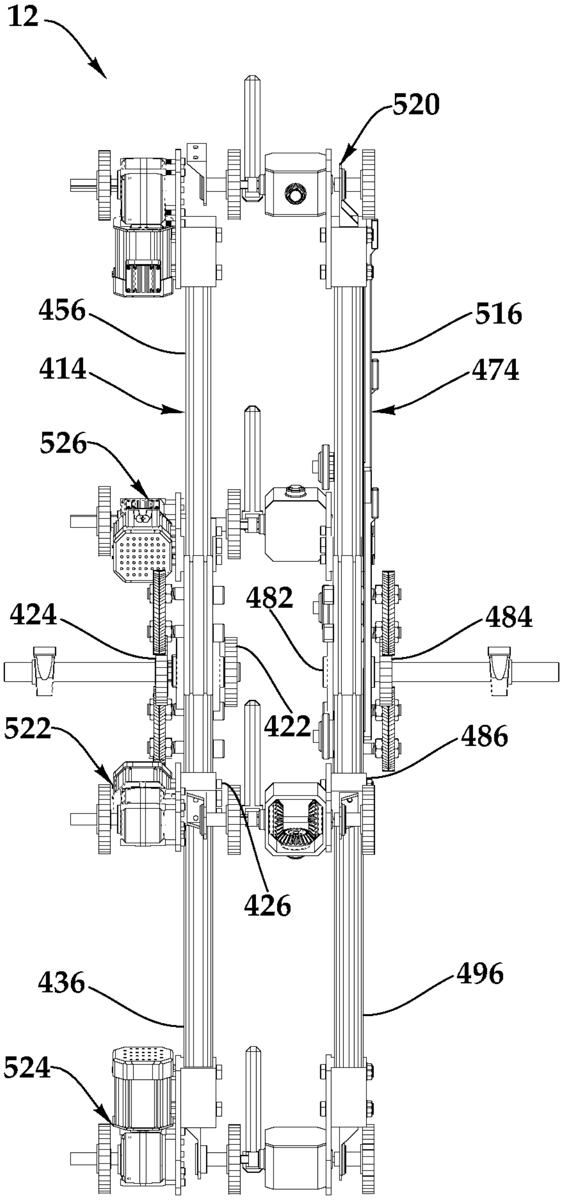
FIG. 16 is a top plan view of the apparatus of FIG. 13.
Figure 17:
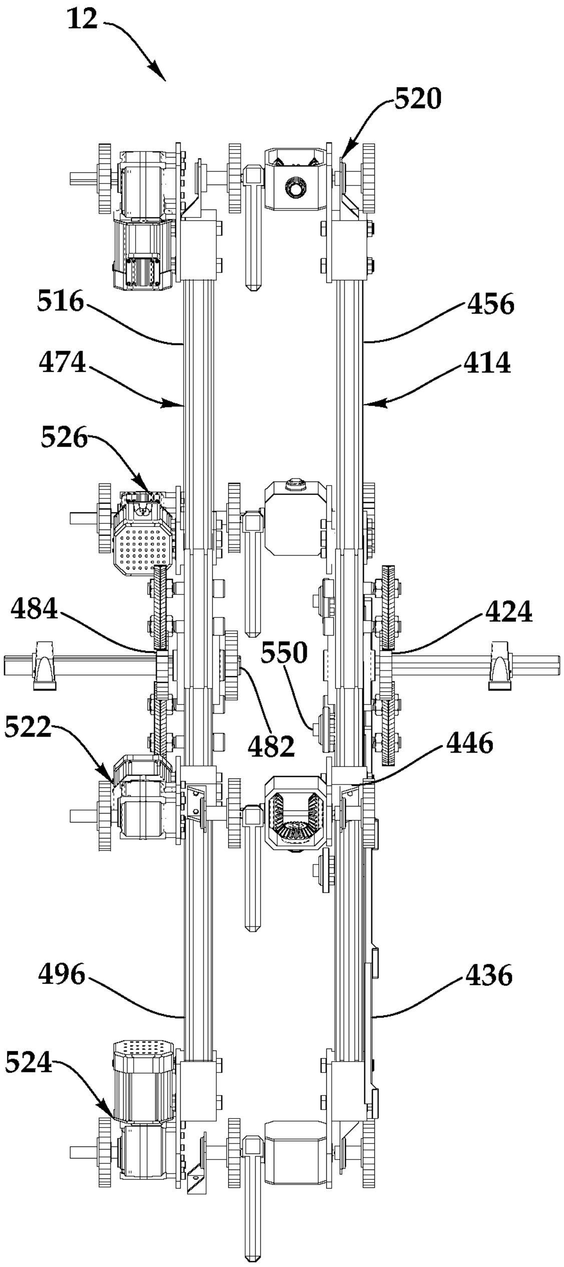
FIG. 17 is a bottom plan view of the apparatus of FIG. 13.
Figure 18:
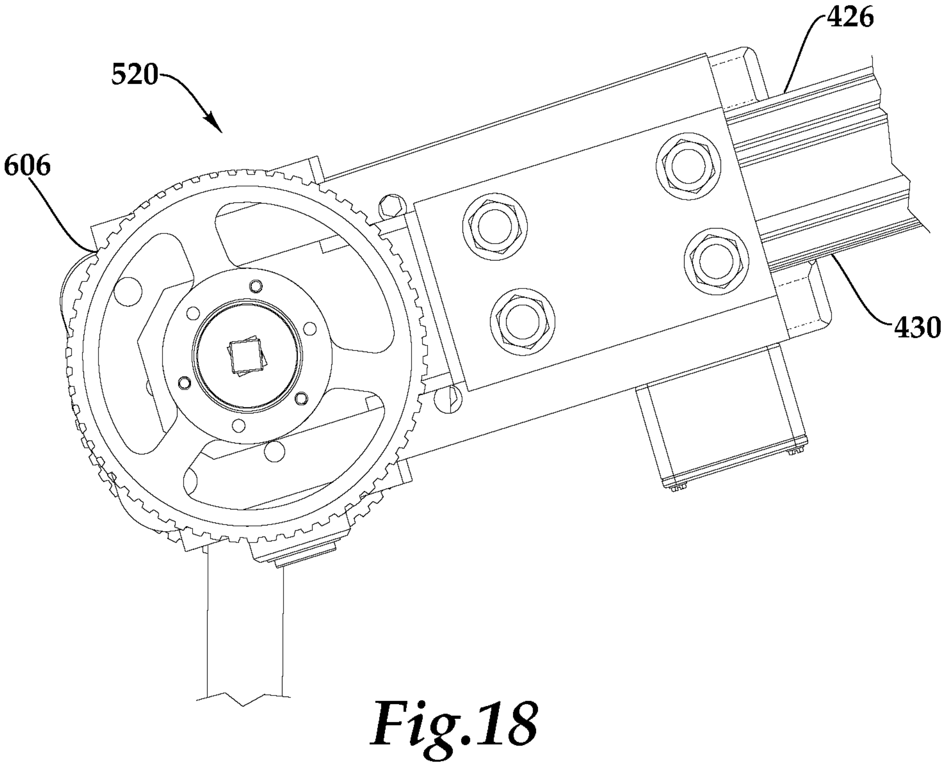
FIG. 18 is a front elevation view of one embodiment of a wheel, which is a component of the apparatus of FIG. 13.
Figure 19:
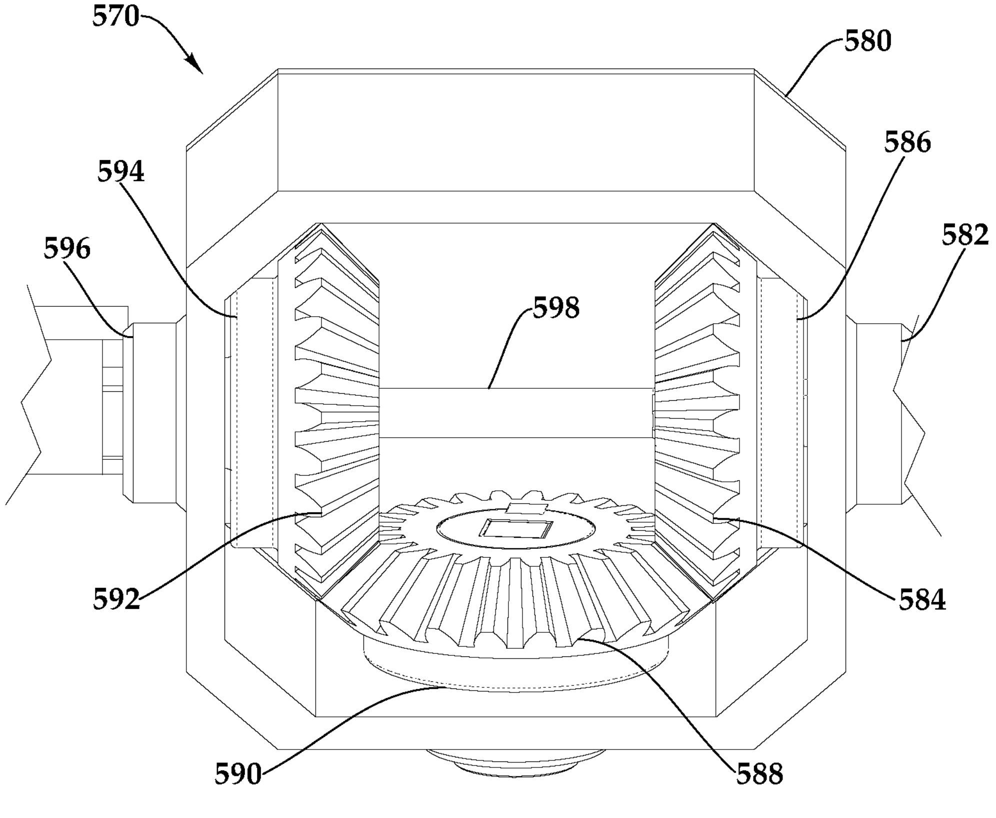
FIG. 19 is a top perspective view of one embodiment of a contra-rotating gearbox, which is a component of the apparatus of FIG. 13.

Referring now to FIG. 12A and FIG. 12B, as previously discussed, the electromechanical components 312 may be integrated with the apparatus 12. As shown, with respect to the apparatus 12, a flywheel 350 is mechanically coupled to the drive unit 150, which, in turn, is secured to the frame 14 by mechanically coupling. The flywheel 350 includes a central hub 352 having radially extending arms 354, 356, 358, 360. The electromechanical components 312, including, but not limited to microgenerators, are secured to the radially extending arms 354, 356, 358, 360 to monitor operation, as well as act as a brake to capture torque. Additionally, as shown, the flywheel 350 is a counter-rotating flywheel.

By way of further example of the applications of the apparatus 12, the apparatus 12 may be utilized with windmill applications, where operators can retrofit existing wind turbine or windmill applications with the apparatus 12 to furnish an efficient means to control and/or create movement within the wind turbine increasing performance while saving both operating and maintenance costs. The apparatus 12 may also be utilized in "nodding donkey applications" where a pumpjack is the overground drive for a submersible pump in a borehole in a walking beam application.

By way of still further examples, the apparatus 12 may be utilized in shipping or locomotion applications by being integrated into rotational movement designs of the cargo ship propeller systems or locomotive freight trains. Both applications, as well as similar applications, benefit from the high torque, low rpm nature of the apparatus 12 to significantly lower operating costs. The apparatus 12 may also be utilized in electric car charging station applications, where in providing a variety of different electric-powered automobiles for consumers, a growing number of issues have arisen: (1) installing recharging stations at existing gas stations; (2) connecting to the area's existing power grid; and (3) providing charging equipment at a reasonable cost. Configured and integrated, the apparatus 12 directly addresses these issues.

This invention provides an apparatus that converts various forms of potential energy, such as wind, water or supply of electricity, into mechanical energy. The system includes conventional mechanical components such as gears, flywheels, and bearings. Energy losses due to friction, air resistance, and mechanical inefficiencies are inherent in the system and are accounted for in the energy conversion process. The apparatus does not generate energy from nothing; instead, it harnesses potential energy—whether from water, wind, capacitor, or battery, for example—in a manner consistent with the laws of thermodynamics.

Referring now to FIG. 13 through FIG. 19, another embodiment of the apparatus 12 is depicted. A frame 414 includes a central hub 420 with a horizontal axis $A_4$ therethrough. The central hub 420 includes an interior surface 422 and an exterior surface 424. An arm rail 426 having a proximal end 428 and a distal end 430 is coupled to the central hub 420 at the proximal end 428 to radially extend from the central hub 420. Similarly, an arm rail 436 having a proximal end 438 and a distal end 440 is coupled to the central hub 420 at the proximal end 438. Likewise, an arm rail 446 with a proximal end 448 and a distal end 450; and an arm rail 456 with a proximal end 458 and a distal end 460 are coupled to the central hub 420 at the respective proximal ends 448, 458.

A frame 474 includes a central hub 480 with the horizontal axis $A_4$ therethrough. The central hub 480 includes an interior surface 482 and an exterior surface 484. An arm rail 486 having a proximal end 488 and a distal end 490 is coupled to the central hub 480 at the proximal end 488 to radially extend from the central hub 480. Similarly, an arm rail 496 having a proximal end 498 and a distal end 500 is coupled to the central hub 480 at the proximal end 498. Likewise, an arm rail 506 with a proximal end 508 and a distal end 510; and an arm rail 516 with a proximal end 518 and a distal end 520 are coupled to the central hub 480 at the respective proximal ends 508, 518. Linkage members 520, 522, 524, 526 respectively mechanically couple the arm rail 426 to the arm rail 486; the arm rail 436 to the arm rail 496; the arm rail 436 to the arm rail 506; and the arm rail 446 to the arm rail 516. Momentum arms 530, 532, 534, 536 having weighted ends or weights 540, 542, 544, 546, respectively, are secured to the pair of frames 414, 417 to form a lattice-like structure.

As depicted, the frames 414, 474 are located in a spaced, offset relationship with a cavity 550 therebetween, such that the interior surface 422 of the hub 420 opposes the interior surface 482 of the hub 480. Further, the frames 414, 474 may include an eccentric positioning. As shown, the frames 414, 474 are positioned in parallel with horizontal axis $A_4$. As one skilled in the art may appreciate, each of the frames 414, 474 may be mounted to a shaft. Further, a drive unit may be secured to the frame 414, for example.

As shown, as a component of the linkage members 520, 522, 524, 526, contra-rotating gearboxes 570, 572, 574, 576 respectively pivotally couple the arm rails 426, 486; the arm rails 436, 496; the arm rails 446, 506; and the arm rails 456, 516. With respect to the contra-rotating gearbox 570, as an exemplary linkage member, contra-rotating gearbox 570 includes a gearbox housing 580 having a drive shaft 582 drivingly connected to a gear 584, which is journaled by a bearing 586, which may be a one-way bearing, within the gearbox housing 580. A gear 588 meshes at a perpendicular angle to the gear 584 with the gear 588 also be journaled by a bearing 590 within the gearbox housing 580. A gear 592 meshes at a perpendicular angle to the gear 588 such that the gear 592 contra-rotates with respect to the gear 584. As shown, the gear 592 opposes the gear 584 and is journaled by a bearing 594, which may be a one-way bearing, at a drive shaft 596 within the gearbox housing 580. As also shown, a drive shaft 598 connects the gear 584 to the gear 592. It should be appreciated that the drive shaft 582, the drive shaft 596, and/or the drive shaft 598 may be at least partially integrated.

Wheel members 602, 604, 606 are associated with a horizontal axis $A_4$ through the drive shaft 582 and the drive shaft 596 to provide balance to the contra-rotating drive shafts 582, 596, parallel to the horizontal axis A3. Each of the wheel members 602, 604, 606 may support a timing belt 610. As best seen in one embodiment illustrated in FIG. 15, the timing belt 610 is positioned about the wheel member 606 as well as seven other wheel members collectively forming wheel member set 640. The timing belt 610 may synchronize the rotation or contra-rotation of the frames 414, 474. It should be appreciated that more than one timing belt may be utilized. By way of example, a timing belt may include the wheel member 602 and seven other wheels collectively forming wheel member set 642. Additionally, parasitic power generators, such as parasitic power generator 660, may be positioned at various positions on the frames 414, 474 to capture energy.

As shown by arrows Rc and RCC and points of rotation P1, P2, P3, P4, which respectively correspond to the momentum arms 530, 532, 534, 536, in response to force F acting on the weights 540, 542, 544, 546 of the momentum arms 530, 532, 534, 536, the points P1, P2, P3, P4 are caused to fixedly rotate about the axis of rotation A4 while the weights 540, 542, 544, 546 are parallel to the ground.

Figure 20:
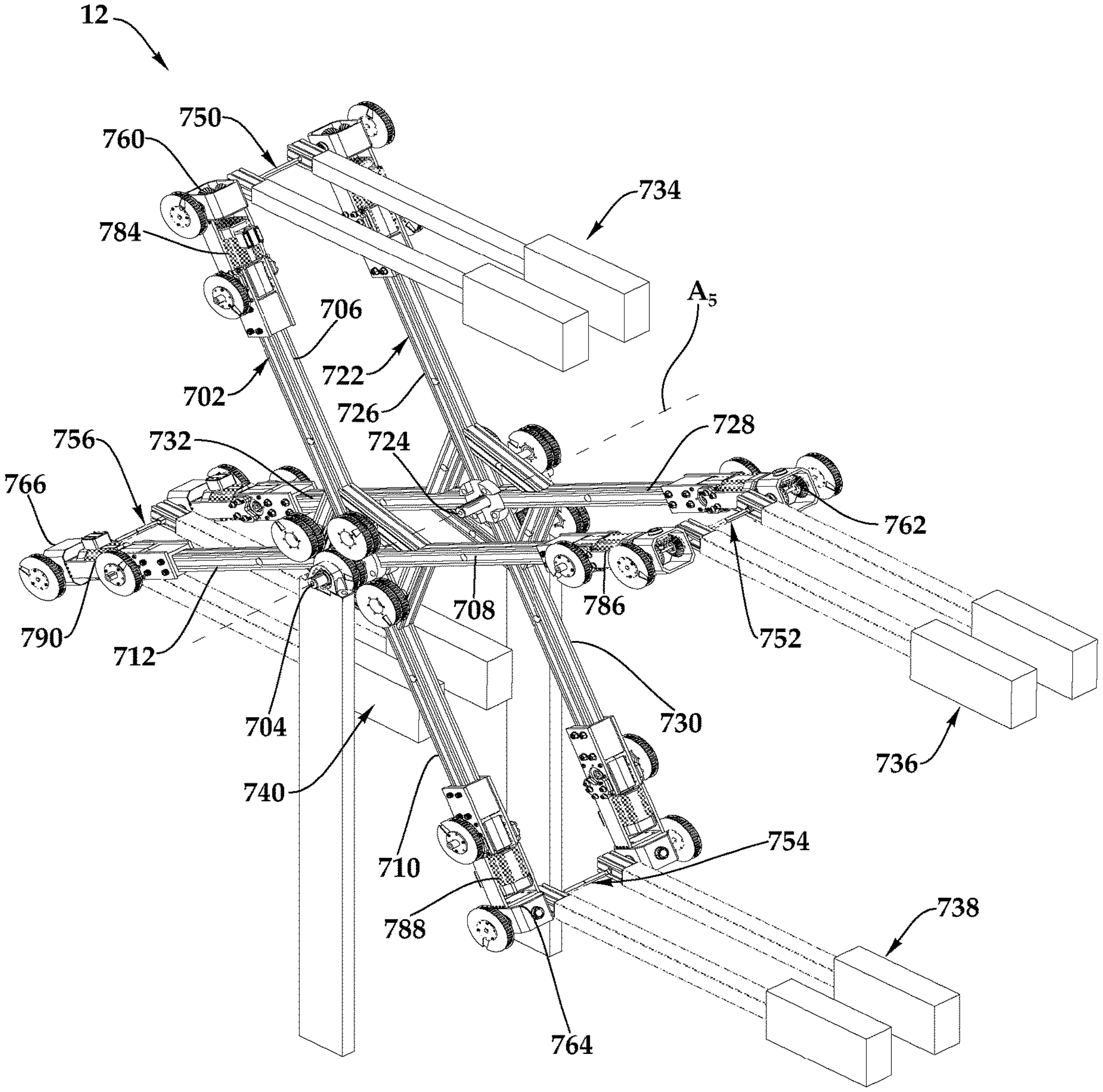
FIG. 20 is a top front perspective view depicting still another embodiment of the apparatus of FIG. 1.
Figure 21:
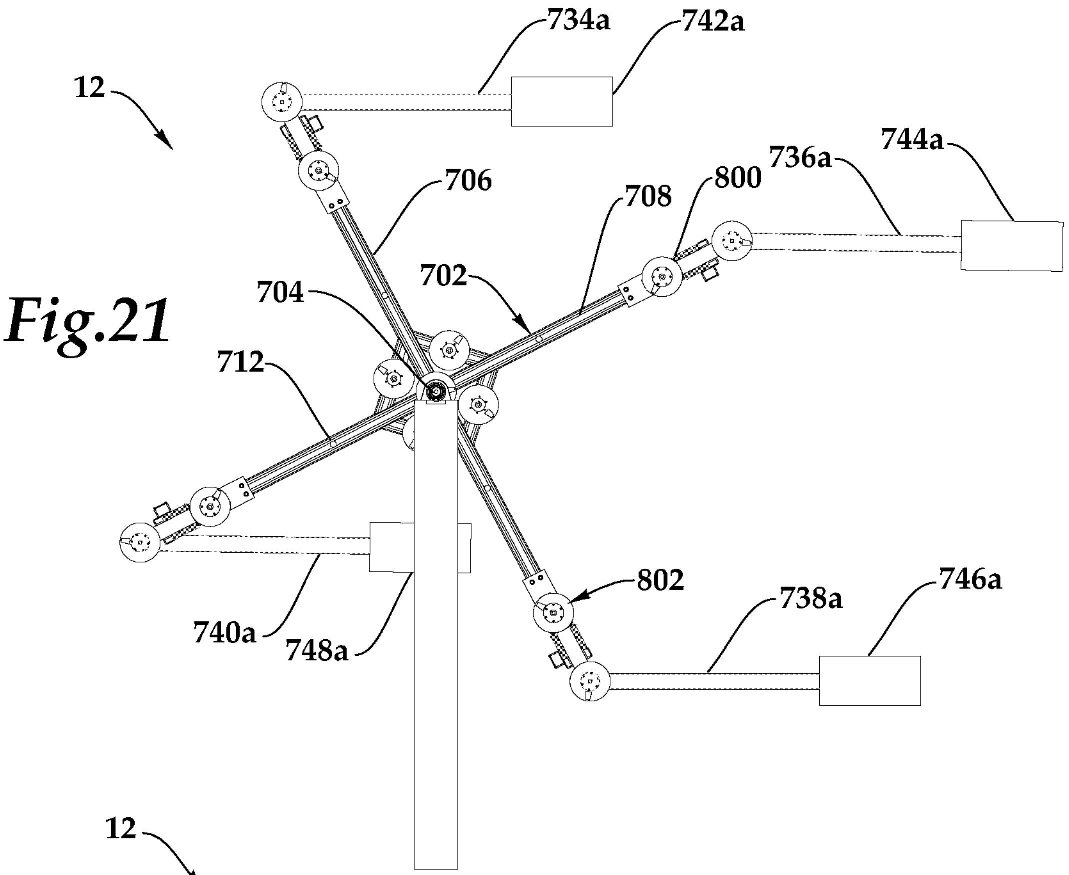
FIG. 21 is a front elevation view of the apparatus of FIG. 20.
Figure 22:
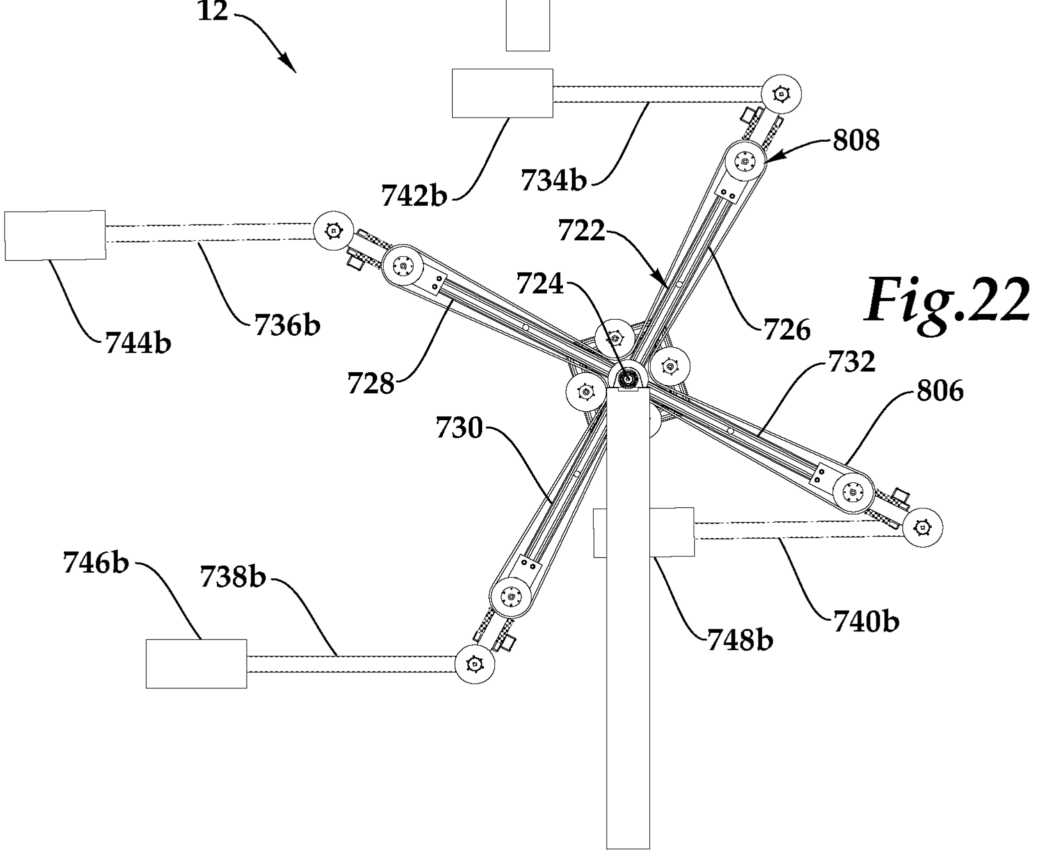
FIG. 22 is a rear elevation view of the apparatus of FIG. 20.

Referring now to FIG. 20 through FIG. 22, another embodiment of the apparatus 12 is depicted. A frame 702 includes a central hub 704 with a horizontal axis $A_5$ therethrough. Arm rails 706, 708, 710, 712 extend from the central hub 704. Similarly, a frame 722 includes a central hub 724 with the horizontal axis $A_5$ therethrough and arm rails 726, 728, 730, 732 extending thereform. Momentum arm members 734, 736, 738, 740 are secured to the pair of frames 702, 722. More particularly, the momentum arm members 734, 736, 738, 740, which may be considered as momentum arms, include momentum arms 734*a*, 736*a*, 738*a*, 740*a* having weighted ends or weights 742*a*, 744*a*, 746*a*, 748*a*, respectively, are secured to the pair of frames 702, 722 to form a lattice-like structure. Further, momentum arms 734*b*, 736*b*, 738*b*, 740*b* having weighted ends or weights 742*b*, 744*b*, 746*b*, 748*b*, respectively, are secured to the pair of frames 702, 722 to form a lattice-like structure.

As shown, as a component of linkage members 750, 752, 754, 756, contra-rotating gearbox pairs 760, 762, 764, 766 respectively pivotally couple the arm rails 706, 726; the arm rails 708, 728; the arm rails 710, 730; and the arm rails 712, 732. Motor sets 784, 786, 788, 790, such as servo or induction motors, are respectively positioned near the ends of the arm rails 706, 726; the arm rails 708, 728; the arm rails 710, 730; and the arm rails 712, 732. Frames 702, 722 may have wheel member sets 802, 808, respectively. As best seen in one embodiment illustrated in FIG. 22, a timing belt 806 is positioned about the wheel member set 808. It should be appreciated that a timing belt may similarly be positioned about the wheel member set 802.

As previously discussed, the contra-rotating differential gear boxes 760, 762, 764, 766 may have a drive shaft therethrough with a pair of one-way bearings mounted at each end of the drive shaft such that the frame 702 rotates a direction and the frame 722 rotates contra-direction. Also, as previously discussed, each of the momentum arms 734, 736, 738, 740 face the same direction and are parallel to the ground. In response to force acting on the weights of the momentum arms 734, 736, 738, 740, which each may include a pair of momentum arm members, are caused to fixedly rotate about the axis of rotation while being parallel to the ground.

Accordingly, the apparatus 12, along with the system 10 and method for use of the same, are provided that efficiently produce power. The mechanical-based solution that, with the assistance of wind, water or electrically stored potential energy, enables the reliable generation of power with high efficiency and is ideal for a variety of applications. As presented above, in some embodiments, the apparatus may include two parallel-spaced frames each having a central hub. Pairs of arm rails radially extend from each central hub with momentum arms secured to the ends thereof. Each of the momentum arms faces the same direction with each of the momentum arms being parallel to the ground.

The order of execution or performance of the methods and data flows illustrated and described herein is not essential, unless otherwise specified. That is, elements of the methods and data flows may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. An apparatus for supplying torque, the apparatus comprising:

- a first frame having a first central hub with a first horizontal axis therethrough, the first central hub having an interior surface;
- a first plurality of arm rails radially extending from the first central hub, each of the first plurality of arm rails having a distal end, the first plurality of arm rails comprising five equally spaced arm rails;
- a second frame having a second central hub with the first horizontal axis therethrough, the second central hub having an interior surface, the second frame being located in a spaced, offset relationship with the first frame such that the second horizontal axis is parallel to the first horizontal axis and a cavity is defined between the first frame and the second frame, with the interior surface of the second central hub opposing the interior surface of the first central hub, the first frame and the second frame having an eccentric positioning;
- a second plurality of arm rails radially extending from the second central hub, each of the second plurality of arm rails having a distal end, the second plurality of arm rails comprising five equally spaced arm rails;
- a plurality of linkage members pivotally respectively coupling the first plurality of arm rails to the second plurality of arm rails, each linkage member having an upper end and a lower end and comprising a pair of spaced vertical connection bars and a plurality of horizontal connection bars spanning a space between the pair of spaced vertical connection bars to form a rigid structure, the upper end being pivotally connected to the distal end of a respective one of the first plurality of arm rails and the lower end being pivotally connected to the distal end of a respective one of the second plurality of arm rails;
- a plurality of momentum arms, each of the plurality of momentum arms having a connection end and a weighted end, the connection end being secured proximate the lower end of a respective linkage member and the weighted end having a weight secured thereat, each of the plurality of momentum arms facing the same direction and being maintained parallel to the ground during rotation of the apparatus; and
- a linear motor secured to at least one of the first frame and the second frame, the linear motor configured to provide an initial force to begin a rotational movement of the apparatus.

2. The apparatus as recited in claim 1, wherein the plurality of momentum arms further comprises an axis of rotation parallel to the first horizontal axis and the second horizontal axis.

3. The apparatus as recited in claim 1, further comprising a drive unit mechanically coupled to the first frame.

4. The apparatus as recited in claim 3, wherein the drive unit comprises a counter-rotating gear box.

5. The apparatus as recited in claim 1, wherein the linear motor is configured to provide continuing or continuous force to maintain the rotational movement of the apparatus.

6. The apparatus as recited in claim 1, further comprising a flywheel mechanically coupled to a drive unit, which is mechanically coupled to the first frame.

7. The apparatus as recited in claim 6, wherein the flywheel comprises a plurality of microgenerators radially secured thereto and is a counter-rotating flywheel.

8. An apparatus for supplying torque, the apparatus comprising:

- a first frame having a first central hub with a first horizontal axis therethrough;
- a first plurality of arm rails radially extending from the first central hub, the first plurality of arm rails including four arm rails equally radially spaced;
- a second frame having a second central hub aligned with the first horizontal axis therethrough, the second frame being located in a spaced relationship with the first frame;
- a second plurality of arm rails radially extending from the second central hub, the second plurality of arm rails including four arm rails equally radially spaced;
- a plurality of linkage members respectively joining the first plurality of arm rails to the second plurality of arm rails, each of the plurality of linkage members including a contra-rotating differential gear box having a drive shaft therethrough with a pair of one-way bearings mounted at each end of the drive shaft such that the first frame rotates a direction and the second frame rotates contra-direction;
- a plurality of momentum arms, each of the plurality of momentum arms having a proximal end and a distal end, the proximal end being coupled to the drive shaft, the distal end having a weight secured thereat;
- each of the plurality of momentum arms facing the same direction, each of the plurality of momentum arms being parallel to the ground, the plurality of momentum arms having an axis of rotation parallel to a horizontal axis;
- a plurality of motor sets respectively positioned near ends of corresponding arm rails of the first plurality of arm rails and the second plurality of arm rails;
- a first wheel member set associated with the first frame;
- a second wheel member set associated with the second frame; and
- a timing belt positioned about at least one of the first wheel member set and the second wheel member set.

9. The apparatus as recited in claim 8, wherein each contra-rotating gearbox pair has a drive shaft therethrough with a pair of one-way bearings mounted at each end of the drive shaft such that the first frame rotates in a direction and the second frame rotates in a contra-direction.

10. The apparatus as recited in claim 8, wherein the motor sets comprise servo motors or induction motors.

11. The apparatus as recited in claim 8, wherein the timing belt is positioned about the second wheel member set and a second timing belt is positioned about the first wheel member set.

* * * * *